(12) United States Patent
Sato et al.

(10) Patent No.: US 11,597,362 B2
(45) Date of Patent: Mar. 7, 2023

(54) VEHICLE AND CONTROL APPARATUS THEREOF

(71) Applicant: HONDA MOTOR CO., LTD., Tokyo (JP)

(72) Inventors: Shinya Sato, Wako (JP); Hiroyuki Koibuchi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 124 days.

(21) Appl. No.: 17/194,459

(22) Filed: Mar. 8, 2021

(65) Prior Publication Data

US 2021/0300307 A1 Sep. 30, 2021

(30) Foreign Application Priority Data

Mar. 27, 2020 (JP) .............................. JP2020-058231

(51) Int. Cl.
*B60T 7/22* (2006.01)

(52) U.S. Cl.
CPC ............. *B60T 7/22* (2013.01); *B60T 2210/32* (2013.01); *B60T 2210/36* (2013.01)

(58) Field of Classification Search
CPC .... B60T 2210/32; B60T 2210/36; B60T 7/22; B60W 2552/53; B60W 30/09; B60W 2555/60; B60W 10/18
USPC ......................................................... 701/70
See application file for complete search history.

(56) References Cited

U.S. PATENT DOCUMENTS

| 7,205,888 | B2 | 4/2007 | Isaji et al. | |
| 2005/0123172 | A1 | 6/2005 | Isaji et al. | |
| 2016/0368492 | A1* | 12/2016 | Al-Stouhi | B60W 30/18154 |
| 2017/0080859 | A1* | 3/2017 | Matsuoka | B60W 50/14 |

(Continued)

FOREIGN PATENT DOCUMENTS

| CN | 112820147 A * | 5/2021 |
| JP | H05-325099 A | 12/1993 |

(Continued)

OTHER PUBLICATIONS

Kim, et al.; Red Light Running Prediction System using LIDAR; Mar. 11, 2019; 2019 IEEE Sensors Applications Symposium (SAS); pp. 2-5 (https://ieeexplore.ieee.org/document/8706098) (Year: 2019).*

(Continued)

*Primary Examiner* — Atul Trivedi
(74) *Attorney, Agent, or Firm* — Thomas | Horstemeyer, LLP

(57) ABSTRACT

A control apparatus of a vehicle includes a collision determination unit configured to determine whether there is the possibility that the vehicle will collide with an object moving in a direction intersecting a longer direction of the vehicle, a signal determination unit configured to determine whether or not a traffic light in front of the vehicle is red, and a braking control unit configured to apply braking force to the vehicle. When the vehicle is travelling toward an intersection, in a case where it is determined that there is the possibility that the vehicle will collide with the moving object, the braking control unit applies higher braking force, and in a case where it is not determined that there is such a possibility and it is determined that the traffic light is red, the braking control unit applies lower braking force.

10 Claims, 8 Drawing Sheets

(56) References Cited

U.S. PATENT DOCUMENTS

| | | | |
|---|---|---|---|
| 2017/0120902 A1* | 5/2017 | Kentley | B60R 19/42 |
| 2018/0134286 A1* | 5/2018 | Yi | B60W 60/00272 |
| 2018/0174449 A1* | 6/2018 | Nguyen | G08G 1/056 |
| 2018/0182246 A1* | 6/2018 | Baba | G06V 10/82 |
| 2018/0182247 A1* | 6/2018 | Baba | B60W 30/0956 |
| 2019/0012912 A1* | 1/2019 | Kim | G08G 1/096716 |
| 2019/0073903 A1* | 3/2019 | Baba | B60W 30/09 |
| 2019/0176816 A1* | 6/2019 | Sakamoto | B60W 30/0956 |
| 2019/0243371 A1* | 8/2019 | Nister | G05D 1/0242 |
| 2019/0291728 A1* | 9/2019 | Shalev-Shwartz | B60T 7/22 |
| 2019/0359204 A1* | 11/2019 | Saito | B60W 30/085 |
| 2020/0058218 A1* | 2/2020 | Julian | G06V 20/56 |
| 2020/0094829 A1* | 3/2020 | Ohmura | B60W 30/143 |
| 2020/0331466 A1* | 10/2020 | Ohmura | B60W 30/18154 |
| 2020/0331467 A1* | 10/2020 | Ohmura | B60W 30/18159 |
| 2020/0331468 A1* | 10/2020 | Ohmura | G06V 20/58 |
| 2020/0339079 A1* | 10/2020 | Ohmura | B60W 30/18159 |
| 2020/0339080 A1* | 10/2020 | Ohmura | B60W 30/0953 |
| 2020/0339114 A1* | 10/2020 | Ohmura | B60W 30/095 |
| 2021/0046924 A1* | 2/2021 | Caldwell | B60W 30/0956 |
| 2021/0110484 A1* | 4/2021 | Shalev-Shwartz | B60W 10/18 |
| 2021/0114514 A1* | 4/2021 | Karol | B60W 60/0011 |
| 2021/0150922 A1* | 5/2021 | Kanagarajan | G08G 5/0026 |
| 2021/0229656 A1* | 7/2021 | Dax | B60W 30/0956 |
| 2021/0339746 A1* | 11/2021 | Yatagai | B60W 30/10 |
| 2021/0380083 A1* | 12/2021 | Kamiya | B60T 7/12 |

FOREIGN PATENT DOCUMENTS

| | | | | |
|---|---|---|---|---|
| JP | H06-012592 A | 1/1994 | | |
| JP | 2005-170154 A | 6/2005 | | |
| WO | WO-2020170766 A1 * | 8/2020 | | B60Q 9/00 |

OTHER PUBLICATIONS

Wang, et al.; Multi-objective driving assistance system for intersection support; Sep. 19, 2010; 13th International IEEE Conference on Intelligent Transportation Systems; pp. 350-352(https://ieeexplore.ieee.org/document/5625190) (Year: 2010).*

Olejnik, et al., Behavior of vehicle drivers while approaching an intersection after the traffic light signal changes from green to yellow; Apr. 18, 2018; 2018 XI International Science-Technical Conference Automotive Safety; pp. 1-4 (https://ieeexplore.ieee.org/document/8373300) (Year: 2018).*

Japanese Office Action for Japanese Patent Application No. 2020-058231 dated Oct. 29, 2021 (partially translated).

* cited by examiner

VEHICLE AND CONTROL APPARATUS THEREOF

CROSS-REFERENCE TO RELATED APPLICATION(S)

This application claims priority to and the benefit of Japanese Patent Application No. 2020-058231 filed on Mar. 27, 2020, the entire disclosure of which is incorporated herein by reference.

BACKGROUND OF THE INVENTION

Field of the Invention

The present disclosure relates to a vehicle and a control apparatus thereof.

Description of the Related Art

Various techniques have been developed in order to enable a driver to safely travel in a vehicle. Japanese Patent Laid-Open No. 2005-170154 describes stopping a vehicle when the traffic light in front of the vehicle is red.

Even when the traffic light in front of the vehicle is red, the vehicle does not necessarily need to stop at this traffic light. Therefore, always stopping the vehicle on a red light can be excessive operation intervention to the driver.

SUMMARY OF THE INVENTION

One aspect of the present disclosure provides a technique for suppressing excessive braking for a vehicle. According to an embodiment of the disclosure, a control apparatus of a vehicle includes a collision determination unit configured to determine whether or not there is the possibility that the vehicle will collide with an object that is moving in a direction intersecting a longer direction of the vehicle, a signal determination unit configured to determine whether or not a traffic light in front of the vehicle is red, and a braking control unit configured to apply first braking force or second braking force that is lower than the first braking force, to the vehicle. When the vehicle is travelling toward an intersection, in a case where it is determined that there is the possibility that the vehicle will collide with the moving object, the braking control unit applies the first braking force to the vehicle, and in a case where it is not determined that there is the possibility that the vehicle will collide with the moving object and it is determined that a traffic light at the intersection is red, the braking control unit applies the second braking force to the vehicle.

BRIEF DESCRIPTION OF THE DRAWINGS

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

DESCRIPTION OF THE EMBODIMENTS

Figure 1:
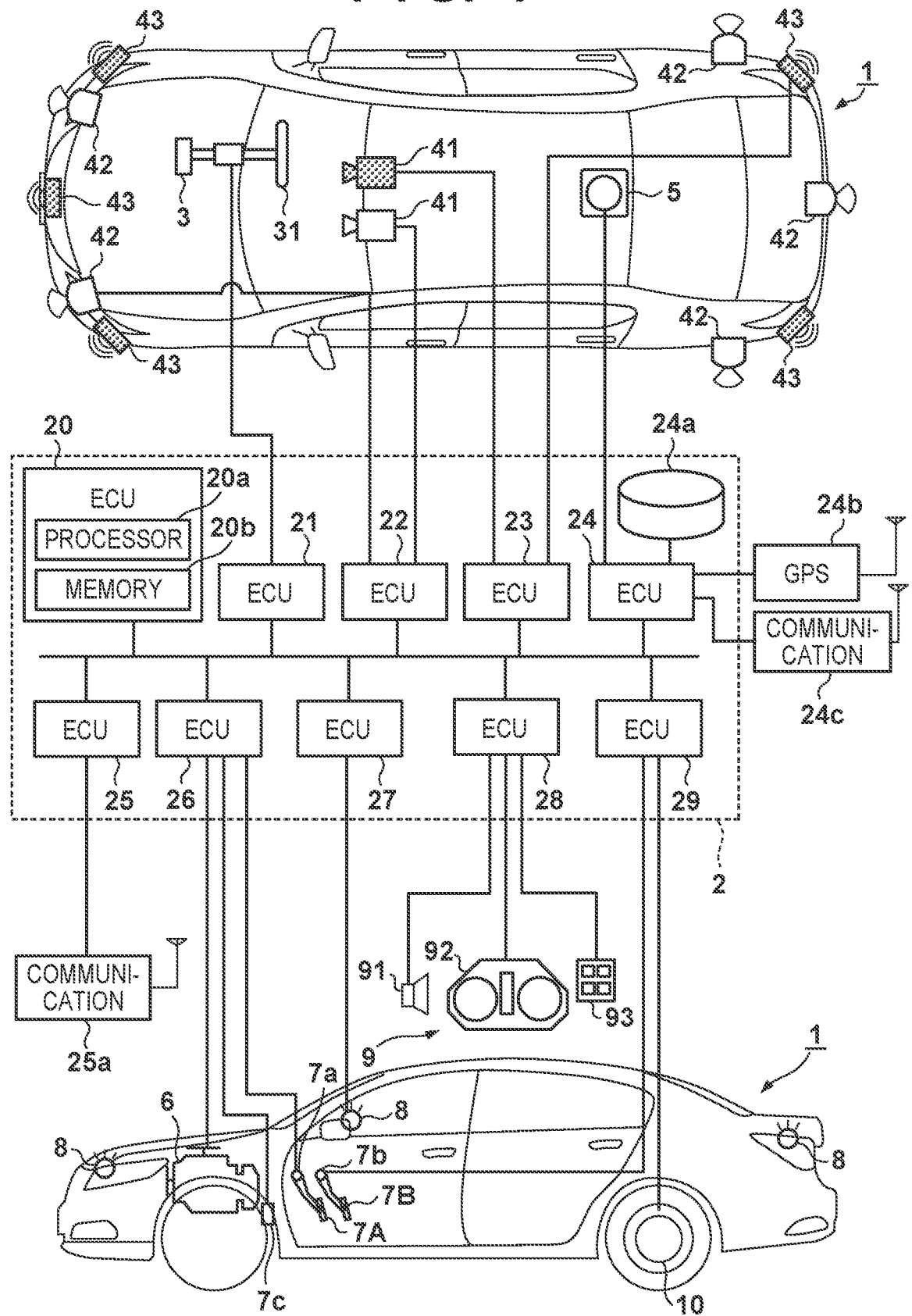
FIG. 1 is a block diagram illustrating a configuration example of a vehicle according to an embodiment of the present disclosure.

Hereinafter, embodiments of the present invention will be described with reference to the attached drawings. In various embodiments, the same reference numerals are given to the same configurations, and redundant description thereof is omitted. In addition, the embodiments can be changed and combined as appropriate.

FIG. 1 is a block diagram of a vehicle 1 according to an embodiment of the present invention. FIG. 1 schematically shows the vehicle 1 in a plan view and a side view. The vehicle 1 is a sedan-type four-wheel passenger car, for example. The vehicle 1 may be such a four-wheel vehicle, or may also be a two-wheeler or another type of vehicle.

The vehicle 1 includes a vehicle control apparatus 2 (hereinafter, simply referred to as "control apparatus 2") that controls the vehicle 1. The control apparatus 2 includes a plurality of ECUs 20 to 29 communicably connected by an in-vehicle network. Each of the ECUs includes a processor represented by a CPU, a memory such as a semiconductor memory, an interface to an external device, and the like. The memory stores programs that are executed by the processor, data that is used for processing by the processor, and the like. Each ECU may also include a plurality of processors, a plurality of memories, a plurality of interfaces, and the like. For example, the ECU 20 includes a processor 20a and a memory 20b. As a result of the processor 20a executing an instruction included in a program stored in the memory 20b, processing of the ECU 20 is executed. In place of this, the ECU 20 may also include a dedicated integrated circuit for executing the processing of the ECU 20 such as an ASIC. The same applies to other ECUs.

Functions respectively assigned to the ECUs 20 to 29, and the like will be described below. Note that the number of ECUs and the assigned functions can be designed as appropriate, and they can be broken into smaller pieces than this embodiment, or can be integrated.

The ECU 20 executes control related to automated travelling of the vehicle 1. In automated driving, at least one of steering and acceleration/deceleration of the vehicle 1 is automatically controlled. Automated travelling that is performed by the ECU 20 may include automated travelling (may also be referred to as "automated driving") that does not require a driver's travelling operation and automated travelling (may also be referred to as "driving assist") for assisting a driver's travelling operation.

The ECU 21 controls an electronic power steering apparatus 3. The electronic power steering apparatus 3 includes a mechanism for steering front wheels according to a driver's driving operation (steering operation) on a steering wheel 31. The electronic power steering apparatus 3 also includes a motor that exerts drive force for assisting a steering operation or automatically steering the front wheels, a sensor that detects a steering angle, and the like. When the driving state of the vehicle 1 is an automated driving state, the ECU 21 automatically controls the electronic power steering apparatus 3 according to an instruction from the ECU 20, and controls the direction of forward movement of the vehicle 1.

The ECUs 22 and 23 control detection units 41 to 43 that detect the situation surrounding the vehicle, and perform information processing on their detection results. Each detection unit 41 is a camera for shooting an image ahead of the vehicle 1 (which may hereinafter be referred to as "camera 41"), and, in this embodiment, is installed at a roof front part on an interior side of the front window of the vehicle 1. By analyzing an image shot by a camera 41, it is possible to extract the contour of a target object and a demarcation line (white line, for example) of a traffic lane on a road.

Each detection unit 42 is a LIDAR (Light Detection and Ranging, may hereinafter be referred to as "LIDAR 42"), detects a target object in the surroundings of the vehicle 1, and measures the distance from the target object. In this embodiment, five LIDARs 42 are provided, two of the five LIDARs 42 being provided at the respective front corners of the vehicle 1, one at the rear center, and two on the respective sides at the rear. Each detection unit 43 is a millimeter-wave radar (which may hereinafter be referred to as "radar 43"), detects a target object in the surroundings of the vehicle 1, and measures the distance from the target object. In this embodiment, five radars 43 are provided, one of the radars 43 being provided at the front center of the vehicle 1, two at the respective front corners, and two at the rear corners.

The ECU 22 controls one camera 41 and the LIDARs 42, and performs information processing on their detection results. The ECU 23 controls the other camera 41 and the radars 43, and performs information processing on their detection results. By providing two sets of apparatuses that detect the surrounding situation of the vehicle, the reliability of detection results can be improved, and by providing detection units of different types such as cameras, LIDARs, radars, and sonars, the surrounding environment of the vehicle can be multilaterally analyzed.

The ECU 24 controls a gyro sensor 5, a GPS sensor 24b, and a communication apparatus 24c, and performs information processing on their detection results or communication results. The gyro sensor 5 detects rotary movement of the vehicle 1. A course of the vehicle 1 can be determined based on a detection result of the gyro sensor 5, a wheel speed, and the like. The GPS sensor 24b detects the current position of the vehicle 1. The communication apparatus 24c wirelessly communicates with a server that provides map information and traffic information, and acquires such information. The ECU 24 can access a database 24a of map information built in a memory, and the ECU 24 searches for a route from the current location to a destination, and the like. The ECU 24, the map database 24a, and the GPS sensor 24b constitute a so-called navigation apparatus.

The ECU 25 includes a communication apparatus 25a for inter-vehicle communication. The communication apparatus 25a wirelessly communicates with another vehicle in the surroundings thereof, and exchanges information with the vehicle.

The ECU 26 controls a power plant 6. The power plant 6 is a mechanism for outputting drive force for rotating the drive wheels of the vehicle 1, and includes an engine and a transmission, for example. For example, the ECU 26 controls output of the engine in accordance with a driver's driving operation (an accelerator operation or an accelerating operation) detected by an operation detection sensor 7a provided on an accelerator pedal 7A, and switches the gear stage of the transmission based on information regarding the vehicle speed or the like detected by a vehicle speed sensor 7c. When the driving state of the vehicle 1 is an automated driving state, the ECU 26 automatically controls the power plant 6 in accordance with an instruction from the ECU 20, and controls the acceleration/deceleration of the vehicle 1.

The ECU 27 controls lighting devices (lights such as headlights and taillights) that include direction indicators 8 (blinkers). In the example in FIG. 1, direction indicators 8 are provided on door mirrors, at the front, and at the rear of the vehicle 1.

The ECU 28 controls an input/output apparatus 9. The input/output apparatus 9 outputs information to the driver, and receives information input by the driver. An audio output apparatus 91 notifies the driver of information using sound. A display apparatus 92 notifies the driver of information through image display. The display apparatus 92 is installed in front of the driver's seat, for example, and constitutes an instrument panel, or the like. Note that, here, sound and display are illustrated, but information may be notified using vibration and light. In addition, information may also be notified using a combination of some of sound, display, vibration, and light. Furthermore, the combination or a notification aspect may be different according to the level of information to be notified (for example, an emergency level). An input apparatus 93 is a group of switches that is disposed at a position where the driver can operate the switches and gives instructions to the vehicle 1, but a sound input apparatus may also be included.

The ECU 29 controls a brake apparatus 10 and a parking brake (not illustrated). The brake apparatus 10 is, for example, a disk brake apparatus, is provided for each of the wheels of the vehicle 1, and decelerates or stops the vehicle 1 by imposing resistance to rotation of the wheels. The ECU 29 controls activation of the brake apparatus 10, for example, in accordance with a driver's driving operation (brake operation) detected by an operation detection sensor 7b provided on a brake pedal 7B. When the driving state of the vehicle 1 is an automated driving state, the ECU 29 automatically controls the brake apparatus 10 in accordance with an instruction from the ECU 20, and controls deceleration and stop of the vehicle 1. The brake apparatus 10 and the parking brake can also be activated to maintain a stopped state of the vehicle 1. In addition, if the transmission of the power plant 6 includes a parking lock mechanism, this can also be activated in order to maintain a stopped state of the vehicle 1.

Figure 2:
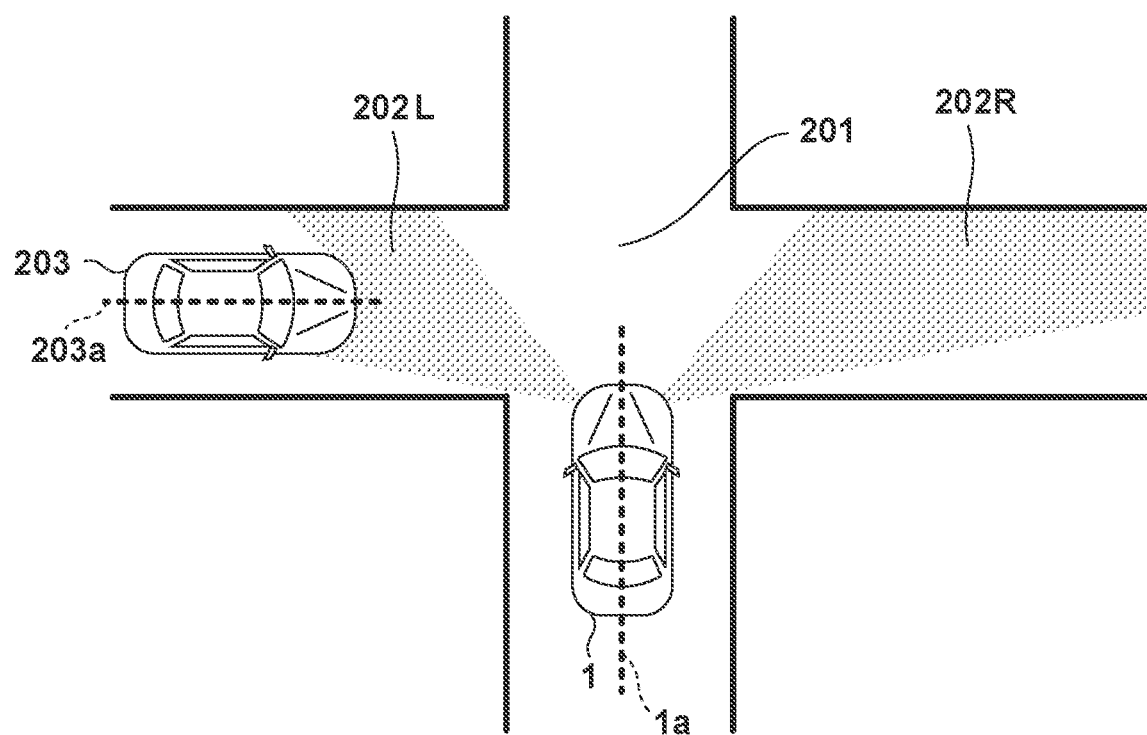
FIG. 2 is a schematic diagram illustrating a collision avoidance function according to an embodiment of the present disclosure.

A collision avoidance function that can be executed by the control apparatus 2 of the vehicle 1 will be described with reference to FIG. 2. Assume that, as shown in FIG. 2, the vehicle 1 is about to enter an intersection 201. The vehicle 1 can detect an object included in a detection region 202L, using the detection unit 43 (the radar 43) mounted on the front left side of the vehicle 1. Also, the vehicle 1 can detect an object included in the detection region 202R, using the detection unit 43 (the radar 43) on the front right side of the vehicle 1.

When it is detected that an object is included in the detection region 202L or 202R, the control apparatus 2 determines whether or not there is the possibility that this object will collide with the vehicle 1. For example, the control apparatus 2 may determine that there is the possibility that the detected object will collide with the vehicle 1 if the object moves in a direction intersecting a longer direction 1a of the vehicle 1. The control apparatus 2 may also determine the possibility of collision further based on the speed of the vehicle 1 and the speed of the object. The longer direction 1a of the vehicle 1 may also be referred to as the front-and-rear direction of the vehicle 1.

For example, assume that, in the example in FIG. 2, a vehicle 203 is also travelling toward the intersection 201. The control apparatus 2 of the vehicle 1 detects that the vehicle 203 is included in the detection region 202L. Since a longer direction 203a of the vehicle 203 intersects the longer direction 1a of the vehicle 1, the control apparatus 2 determines that there is the possibility that the vehicle 1 will collide with the vehicle 203.

If it is determined that there is the possibility that the vehicle 1 will collide with another object, the control apparatus 2 executes an operation for avoiding collision with the vehicle 203 (hereinafter, referred to as a "collision avoidance operation"). Specifically, the control apparatus 2 may alert the driver that there is the possibility of colliding with the vehicle 203, using the display apparatus 92, as the collision avoidance operation. Alternatively or in addition, the control apparatus 2 may decrease the speed of the vehicle 1 by causing the brake apparatus 10 to operate. When alerting the driver on the possibility of collision, the control apparatus 2 may also present, to the driver, the position of the detected object (for example, right or left) and the type of the detected object (for example, a vehicle, a person, a bicycle).

In the example in FIG. 2, the vehicle 203 is used as an example of an object that is to be avoided. Alternatively, an object that is to be avoided may be another object such as a person or a bicycle. In the example in FIG. 2, the object included in the detection region 202L is detected by the radar 43. Alternatively, the object included in the detection region 202L may also be detected using a LIDAR or a camera, or any combination of a LIDAR, a camera and a radar. The same apples to the detection region 202R.

Examples where the vehicle 1 is and is not permitted to pass an intersection when a traffic light installed at the intersection is red will be described with reference to FIGS. 3A to 3E. Assume that, in FIGS. 3A, 3C, and 3E, left-side driving is adopted by law as in Japan. Assume that, in FIGS. 3B and 3D, right-side driving is adopted by law as in U.S.A. FIGS. 3A to 3E illustrate examples where the intersection is a crossroad, but the following examples can be applied to a case where the intersection is a T-junction.

Figure 3A:
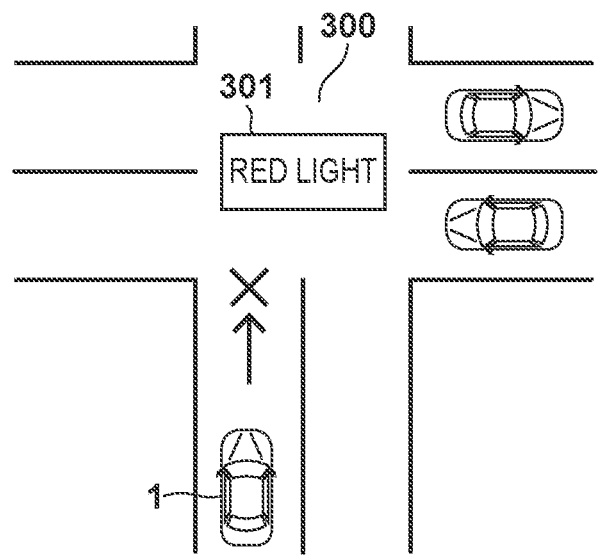
FIGS. 3A to 3E are diagrams illustrating an example of an intersection according to an embodiment of the present disclosure.

Assume that, in the example in FIG. 3A, the vehicle 1 is travelling toward an intersection 300. Assume that, for the road on which the vehicle 1 is travelling, a traffic light 301 is installed at the intersection 300, and that the traffic light 301 is red. In the case where a law that permits vehicles to pass the intersection 300 when the traffic light 301 is red is not stipulated, the vehicle 1 cannot pass the intersection 300.

Figure 3B:
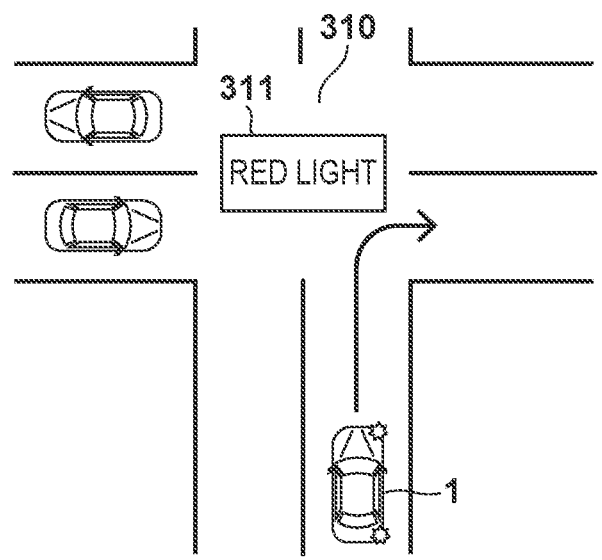

Assume that, in the example in FIG. 3B, the vehicle 1 is travelling toward an intersection 310. Assume that, for the road on which the vehicle 1 is travelling, a traffic light 311 is installed at the intersection 310, and that the traffic light 311 is red. As in U.S.A., "turn on red" is permitted at the intersection 310, in other words, it is stipulated by law that vehicles can make a right turn at the intersection 310 even when the traffic light 311 is red. In this case, the vehicle 1 can pass the intersection 310 if making a right turn, and cannot pass the intersection 310 if proceeding in a different direction (if making a left turn or proceeding in a straight line).

Figure 3C:
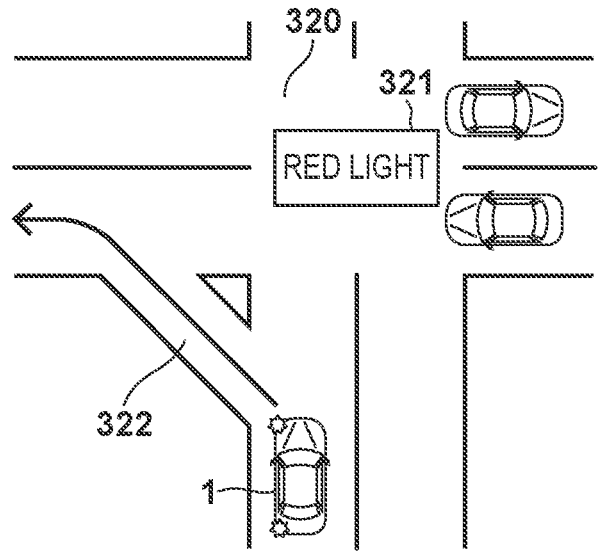

Assume that, in the example in FIG. 3C, the vehicle 1 is travelling toward an intersection 320. Assume that, for the road on which the vehicle 1 is travelling, a traffic light 321 is installed at the intersection 320, and that the traffic light 321 is red. Assume that a road sign "turn left at any time" is installed at the intersection 320. In the case where a road sign "turn left at any time" is installed, the vehicle 1 can make a left turn through a road 322 irrespective of the signal of the traffic light 321.

Figure 3D:
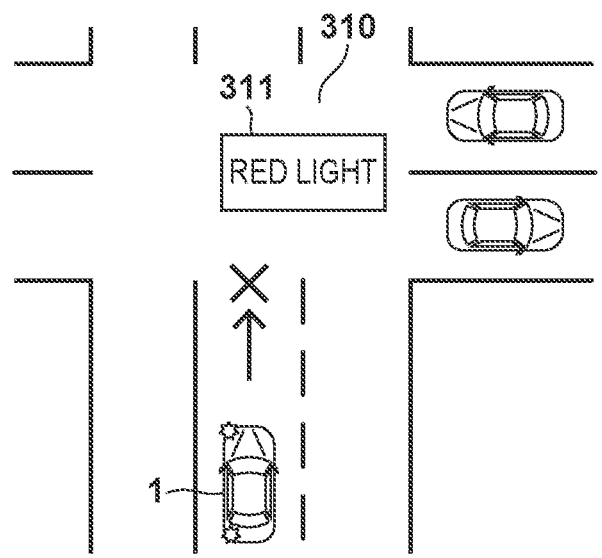

Assume that, in the example in FIG. 3D, the vehicle 1 is travelling toward an intersection 330. Assume that, for the road on which the vehicle 1 is travelling, a traffic light 331 is installed at the intersection 330, and that the traffic light 331 is red. Assume that, similarly to the intersection 310 in FIG. 3B, "turn on red" is implemented at the intersection 330. Assume that the vehicle 1 is about to make a left turn at the intersection 330. In this case, making a left turn at the intersection 330 while the traffic light 331 is red is prohibited by law, and thus the vehicle 1 cannot pass the intersection 330, and stops on the red light.

Figure 3E:
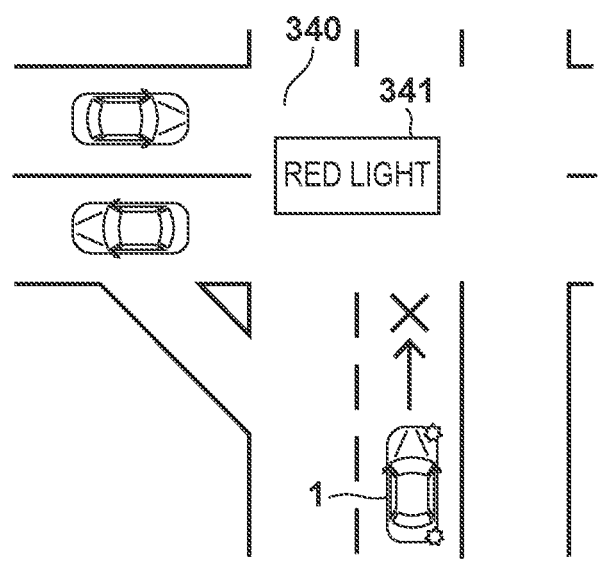

Assume that, in the example in FIG. 3E, the vehicle 1 is travelling toward an intersection 340. Assume that, for the road on which the vehicle 1 is travelling, a traffic light 341 is installed at the intersection 340, and that the traffic light 341 is red. Similarly to the intersection 320 in FIG. 3C, it is permitted to make a left turn at the intersection 340 at any time. Assume that the vehicle 1 is about to make a right turn at the intersection 340. In this case, the vehicle 1 is prohibited by law from making a right turn at the intersection 340 while the traffic light 341 is red, and thus the vehicle 1 cannot pass the intersection 340, and stops on the red light.

Figure 4:
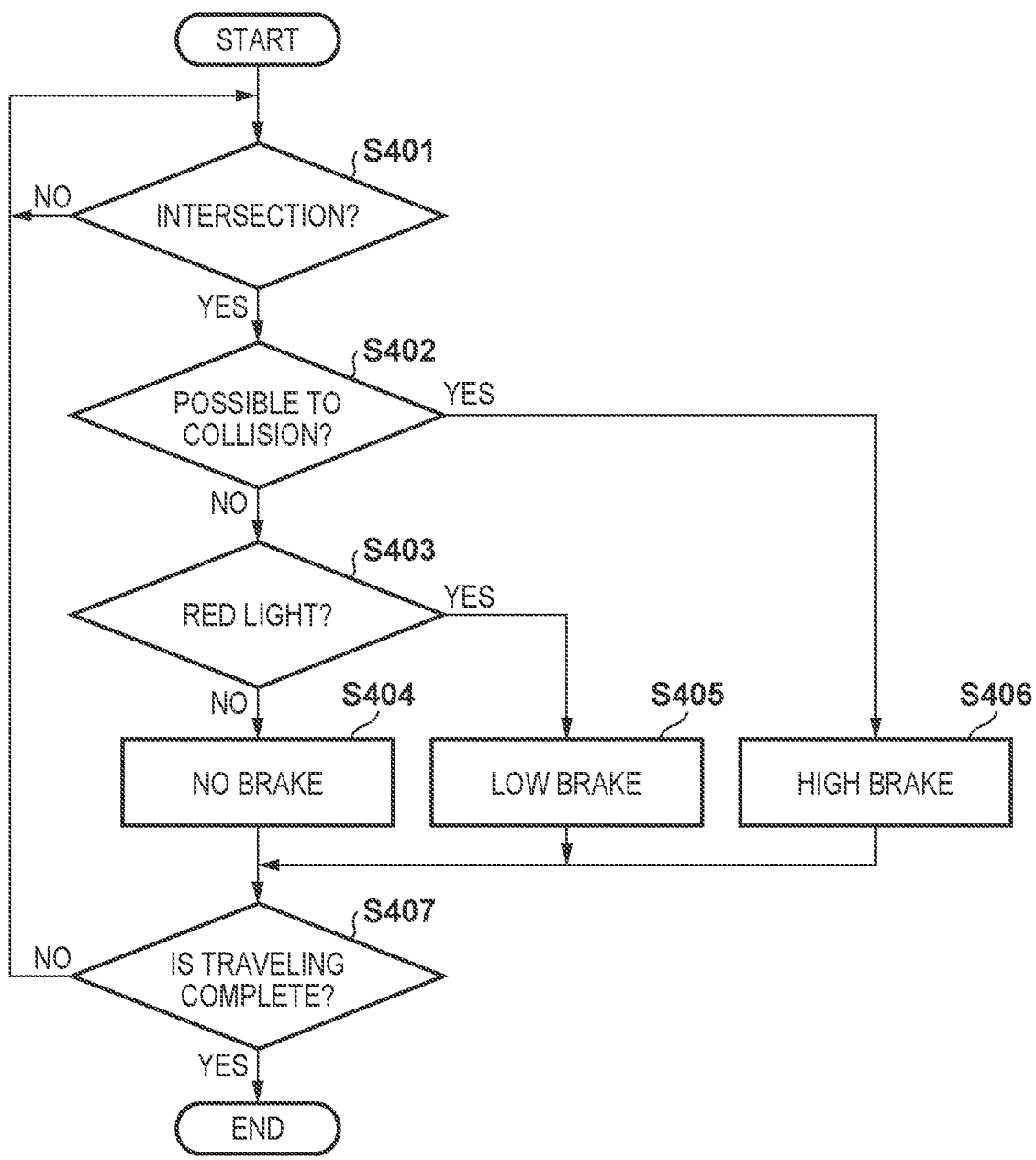
FIG. 4 is a flowchart illustrating an example of a control method according to an embodiment of the present disclosure.

Next, an example of a method in which the control apparatus 2 controls the vehicle 1 will be described with reference to FIG. 4. The method in FIG. 4 is processed, for example, as a result of the processor 20a of the ECU 20 executing an instruction of a program stored in the memory 20b of the ECU 20. Alternatively, a configuration may also be adopted in which dedicated hardware (for example, a circuit) executes the steps of the method. This method is started in accordance with the vehicle 1 starting travelling. The method in FIG. 4 may also be executed while the vehicle 1 is being manually driven by the driver. In this case, the control apparatus 2 executes the method in FIG. 4 as a travelling assist for the driver that is performing manual driving.

In step S401, the control apparatus 2 determines whether or not the vehicle 1 is travelling toward an intersection. If the vehicle 1 is travelling toward an intersection (YES in step S401), the procedure advances to step S402, otherwise (NO in step S401) step S401 is repeated. The control apparatus 2 may perform this determination, for example, based on map information and an image shot by a camera 41.

In step S402, the control apparatus 2 determines whether or not there is the possibility that the vehicle 1 will collide with an object that is moving in a direction intersecting the vehicle 1. If there is the possibility the vehicle 1 will collide with such an object (YES in step S402), the procedure advances to step S406, otherwise (NO in step S402) the procedure advances to step S403. The determination on whether or not there is the possibility the vehicle 1 will have a collision may be performed as described above with reference to FIG. 2. In step S406, the control apparatus 2 applies high braking force to the vehicle 1 as a collision avoidance operation independently of a braking operation performed by the driver. Here, "high" force refers to force that is high relative to the braking force in step S405 to be described later. The high braking force may also be braking force that is sufficiently high to stop the vehicle 1. The vehicle 1 to which high braking force has been applied may stop without passing the intersection, or in front of the intersection. This braking force may be supplied as a result of the control apparatus 2 controlling the brake apparatus 10.

In step S403, the control apparatus 2 determines whether or not a traffic light installed at the intersection in front of the vehicle is red. If the traffic light is red (YES in step S403), the procedure advances to step S405, otherwise (NO in step S403), the procedure advances to step S404. The control apparatus 2 may perform this determination based on an image shot by a camera 41. In step S405, the control apparatus 2 applies low braking force to the vehicle 1, and decreases the speed of the vehicle 1. Here, "low" force refers to force that is low relative to the braking force in step S406 described above. The low braking force may also be braking force that is low to the extent where the vehicle 1 is not stopped at the intersection. This braking force may be applied as a result of the control apparatus 2 controlling the brake apparatus 10.

As described above with reference to FIGS. 3A to 3E, there are cases where the vehicle 1 can pass the intersection even when the traffic light in front of the vehicle 1 is red. Therefore, constantly applying braking force to the extent where the vehicle is stopped at the red light may be bothersome to the driver. In view of this, in the method in FIG. 4, when the vehicle 1 is travelling toward an intersection, even when the traffic light in front of the vehicle 1 is red, the control apparatus 2 does not apply high braking force, and keeps braking force low. The control apparatus 2 calls attention of the driver to the fact that the traffic light in front of the vehicle 1 is red, by applying low braking force in this manner.

Step S404 is performed when there is no possibility that the vehicle 1 will collide with another moving object, and it is not necessary to stop at the traffic light in front of the vehicle 1. In view of this, the control apparatus 2 does not apply braking force to the vehicle 1.

In step S407, the control apparatus 2 determines whether or not travelling is complete. If travelling is complete (YES in step S407), the procedure ends, otherwise (NO in step S407) the procedure advances to step S401. As a result of repeating the processing in this manner, the control apparatus 2 can apply high braking force until there is no possibility of collision. In addition, the control apparatus 2 can stop supplying low braking force when the traffic light in front of the vehicle 1 has changed to green, for example.

Figure 5:
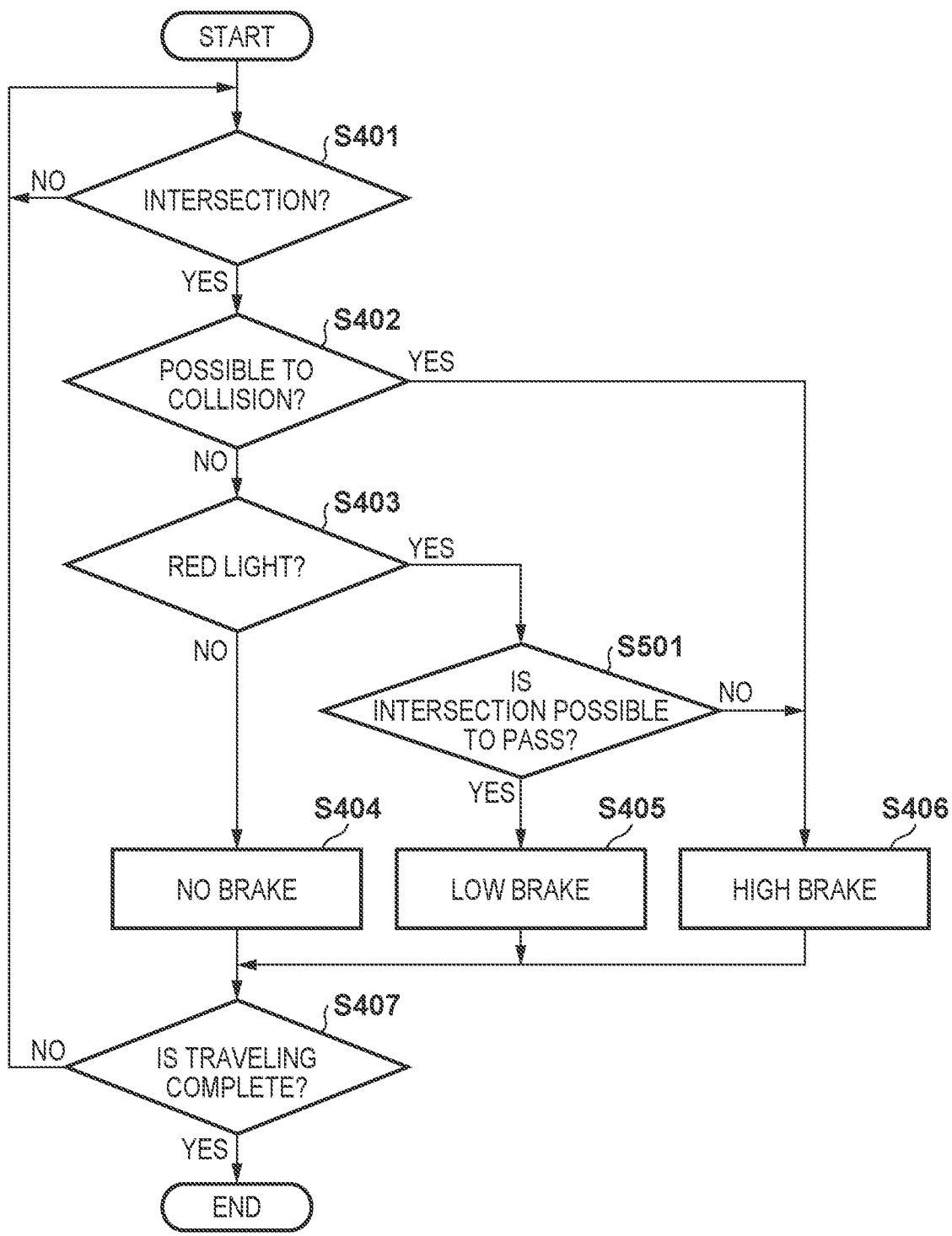
FIG. 5 is a flowchart illustrating another example of the control method according to an embodiment of the present disclosure.

Next, another example of the method in which the control apparatus 2 controls the vehicle 1 will be described with reference to FIG. 5. In the method in FIG. 5, the control apparatus 2 controls braking of the vehicle 1 further based on whether or not the vehicle 1 can pass an intersection in front of the vehicle 1 even on a red light. A description on similar points to those in the method described with reference to FIG. 4 is omitted, and differences will be mainly described below.

If it is determined in step S403 that the traffic light installed at the intersection in front of the vehicle 1 is red (YES in step S403), the control apparatus 2 advances the procedure to step S501. In step S501, the control apparatus 2 determines whether or not it is permitted to pass the intersection in front of the vehicle 1 even when the traffic light installed at this intersection is red. If it is permitted to pass this intersection (YES in step S501), the procedure advances to step S405, otherwise (NO in step S501), the procedure advances to step S406. This determination may be performed based on a law of the country or region that includes the geographical location of the vehicle 1, a road sign installed at the intersection 310 and shot by a camera 41, and the like. The country or region that includes the geographical location of the vehicle 1 may be stored in a storage apparatus (for example, the memory 20b) of the vehicle 1 in advance, or may also be determined based on the position information of the vehicle 1 measured by the GPS sensor 24b.

For example, when the vehicle 1 is travelling in a country where "turn on red" is permitted (for example, U.S.A.), the control apparatus 2 determines that the vehicle 1 can pass the intersection in front of the vehicle 1 even on a red light unless the circumstances are exceptional. In addition, even when the vehicle 1 is travelling in such a country, if there is a road sign "no turn on red", the control apparatus 2 determines that the vehicle 1 cannot pass the intersection in front of the vehicle 1 on a red light. In addition, if there is a road sign "turn left at any time", the control apparatus 2 determines that the vehicle can pass the intersection in front of the vehicle 1 even on a red light.

If it is not permitted to pass the intersection in front of the vehicle 1 on a red light, the vehicle 1 needs to stop at this intersection (for example, on a stop line). In view of this, the control apparatus 2 advances the procedure to step S406, and applies high braking force to the vehicle 1. On the other hand, if it is permitted to pass the intersection in front of the vehicle 1 on a red light, the vehicle 1 advances the procedure to step S405, and applies low braking force to the vehicle 1.

Figure 6:
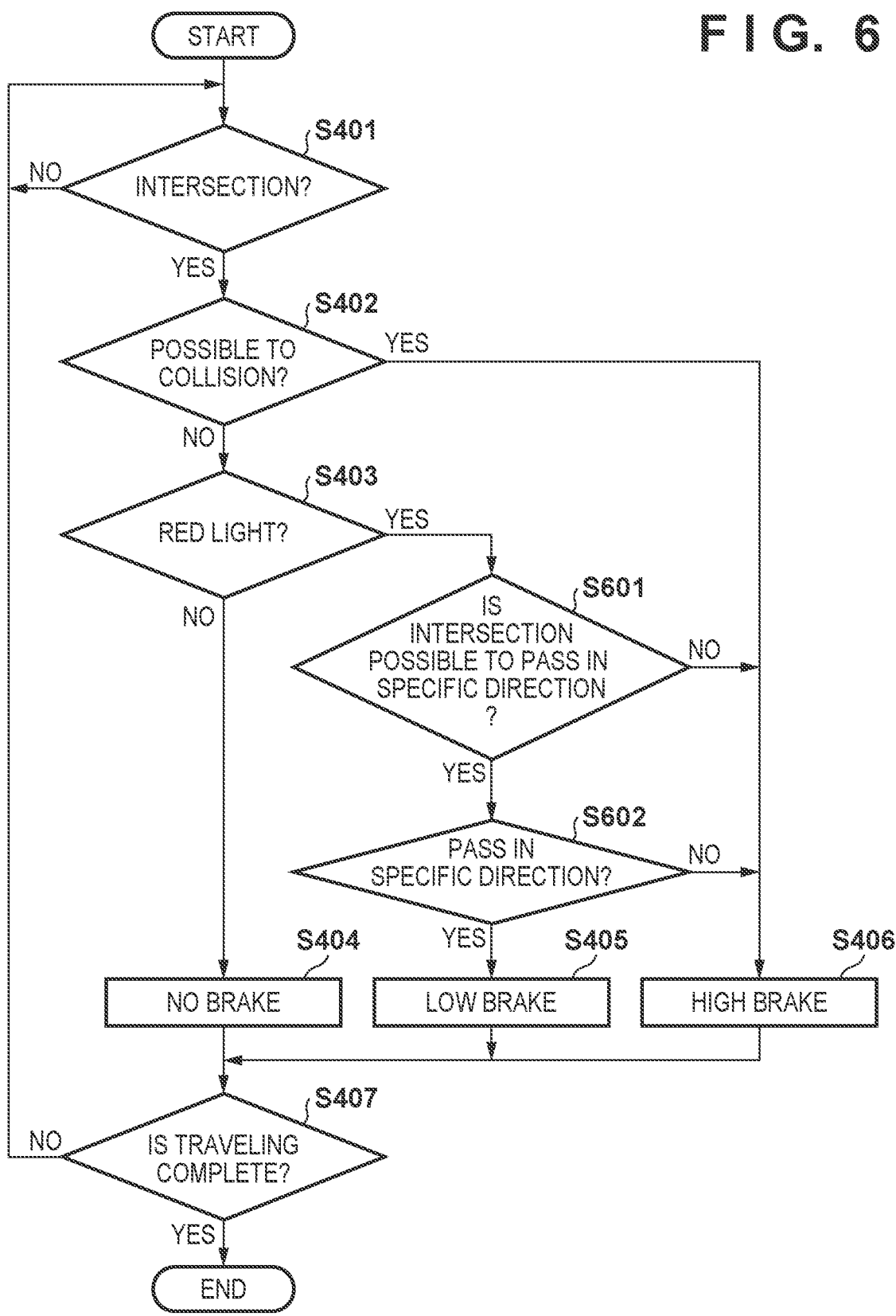
FIG. 6 is a flowchart illustrating yet another example of the control method according to an embodiment of the present disclosure.

Next, yet another example of the method in which the control apparatus 2 controls the vehicle 1 will be described with reference to FIG. 6. In the method in FIG. 6, the control apparatus 2 controls braking of the vehicle 1 based on whether or not it is permitted to pass the intersection in front of the vehicle 1 in a specific direction even on a red light and a direction in which the vehicle 1 is to proceed. A description on similar points to those in the method described with reference to FIG. 4 is omitted, and differences will be mainly described below.

In step S403, if the traffic light installed at the intersection in front of the vehicle is red (YES in step S403), the control apparatus 2 advances the procedure to step S601. In step S601, the control apparatus 2 determines whether or not it is permitted to pass this intersection in a specific direction even when the traffic light installed at the intersection in front of the vehicle is red. If it is permitted to pass this intersection in a specific direction (YES in step S601), the procedure advances to step S602, otherwise (NO step S601) the procedure advances to step S406. This determination may be performed based on a law of the country or region that includes the geographical location of the vehicle 1, a road sign installed at the intersection 310 and shot by the camera 41, and the like. The country or region that includes the geographical location of the vehicle 1 may be stored in a storage apparatus (for example, the memory 20b) of the vehicle 1 in advance, or may also be determined based on the position information of the vehicle 1 measured by the GPS sensor 24b.

For example, when the vehicle 1 is travelling in a country in which "turn on red" is permitted (for example, U.S.A.), the control apparatus 2 determines that it is permitted to pass the intersection in front of the vehicle 1, in the rightward direction even on a red light (in the case of right-side driving), unless the circumstances are exceptional. In addition, even when the vehicle 1 is travelling in such a country, if there is a road sign "no turn on red", the control apparatus 2 determines that it is not permitted to pass the intersection in front of the vehicle 1 on a red light. In addition, if there is a road sign "turn left at any time", the control apparatus 2 determines that it is permitted to pass the intersection in front of the vehicle 1, in the left direction even on a red light.

In step S602, the control apparatus 2 determines whether or not the vehicle 1 is to pass the intersection in a direction in which it is permitted to pass the intersection even when the traffic light is red. If the vehicle 1 is to pass this intersection in such a specific direction (YES in step S602), the procedure advances to step S405, otherwise (NO in step S602) the procedure advances to step S406. This determination may be performed based on a direction instructed using direction indicators 8 of the vehicle 1, the traffic lane on which the vehicle 1 is travelling, or a route along which the driver of the vehicle 1 is guided. For example, in the case where the vehicle 1 is travelling on a traffic lane on the left side and the direction indicators 8 of the left direction are turned on as shown in FIG. 3C, the control apparatus 2 can determine that the vehicle 1 is to make a left turn at the intersection 320. As shown in FIG. 3E, when the vehicle 1 is travelling on a traffic lane on the right side, the control apparatus 2 can determine that the vehicle 1 is not to make a left turn at the intersection 320.

If it is determined that it is not permitted to pass the intersection in front of the vehicle 1, in a specific direction on a red light, or if it is permitted to pass the intersection in a specific direction but it is determined that the vehicle 1 is not to pass the intersection in the direction, the vehicle 1 needs to stop at this intersection (for example, on a stop line). In view of this, the control apparatus 2 advances the procedure to step S406, and applies high braking force to the vehicle 1. On the other hand, if it is determined that it is permitted to pass the intersection in front of the vehicle 1 in a specific direction on a red light, and it is determined that the vehicle 1 is not to pass the intersection in the direction, the control apparatus 2 advances the procedure to step S405, and applies low braking force to the vehicle 1.

In step S405 of the methods described with reference to FIGS. 4 to 6, the control apparatus 2 applies low braking force to the vehicle 1 in order to call attention of the driver to the fact that the traffic light in front of the vehicle 1 is red. Alternatively, the control apparatus 2 does not need to apply braking force, in step S405. In this case, the control apparatus 2 may call attention of the driver using another method (for example, sound output or image output), or does not need to call attention of the driver to the fact that the traffic light in front of the vehicle 1 is red.

Figure 7:
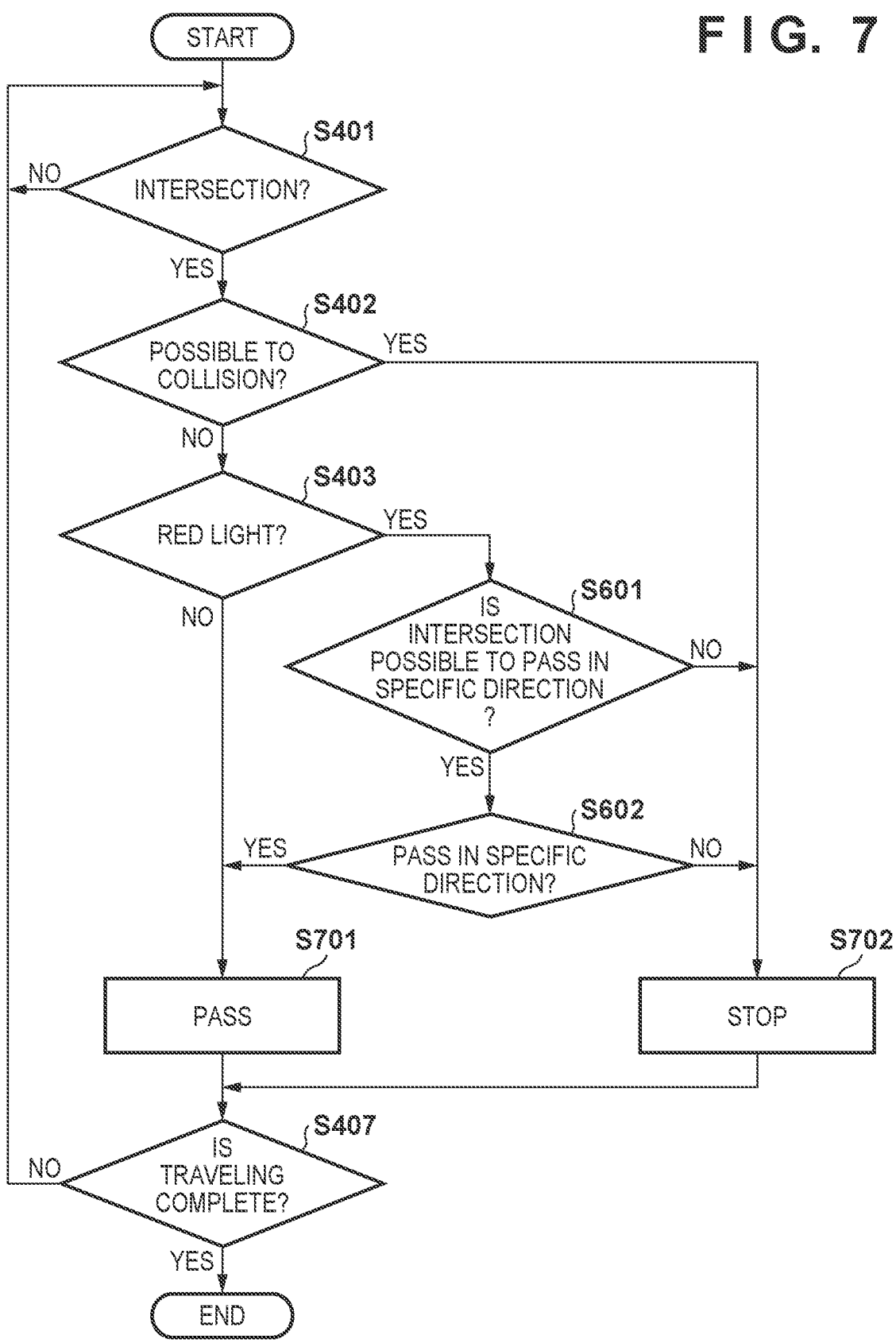
FIG. 7 is a flowchart illustrating yet another example of the control method according to an embodiment of the present disclosure.

Next, yet another example of the method in which the control apparatus 2 controls the vehicle 1 will be described with reference to FIG. 7. The method in FIG. 7 is processed, for example, as a result of the processor 20a of the ECU 20 executing an instruction of a program stored in the memory 20b of the ECU 20. Alternatively, a configuration may also be adopted in which dedicated hardware (for example, a circuit) executes the steps of the method. This method is started in accordance with the vehicle 1 starting travelling. The method in FIG. 7 may also be executed w % bile the control apparatus 2 is performing automated driving of the vehicle 1. Differences from the method in FIG. 6 will be described below.

If the determination in step S402 is "YES" (if there is the possibility of collision), if the determination in step S601 is "NO" (if it is not permitted to pass the intersection on a red light), and if the determination in step S602 is "NO" (if the vehicle is not to pass the intersection in a direction in which it is permitted pass the intersection), the control apparatus 2 advances the procedure to step S702. In step S702, the control apparatus 2 stops the vehicle 1. Since automated driving is being performed, the control apparatus 2 cannot expect prompt operation intervention by the driver. In view of this, the control apparatus 2 performs control for stopping the vehicle 1 in a situation where the vehicle 1 needs to be stopped.

If the determination in step S403 is "NO" (if the traffic light is not red), or, if the determination in step S602 is "YES" (if the vehicle 1 is to pass the intersection in a direction in which it is permitted to pass the intersection), the control apparatus 2 advances the procedure to step S701. In step S701, the control apparatus 2 controls travelling of the vehicle 1 so as to pass the intersection. The control apparatus 2 may decrease the speed of the vehicle 1 as necessary (for example, at the time of a right turn or a left turn).

Embodiment Overview

Item 1. A control apparatus (2) of a vehicle (1), the apparatus comprising:

a collision determination unit configured to determine whether or not there is the possibility that the vehicle will collide with an object (203) that is moving in a direction intersecting a longer direction of the vehicle (step S402);

a signal determination unit configured to determine whether or not a traffic light in front of the vehicle is red (step S403); and a braking control unit configured to apply first braking force or second braking force that is lower than the first braking force, to the vehicle (steps S405 and S406), wherein, when the vehicle is travelling toward an intersection (step S401), in a case where it is determined that there is the possibility that the vehicle will collide with the moving object (step S402), the braking control unit applies the first braking force to the vehicle (step S406), and in a case where it is not determined that there is the possibility that the vehicle will collide with the moving object and it is determined that a traffic light at the intersection is red (step S403), the braking control unit applies the second braking force to the vehicle (step S405).

According to this embodiment, it is possible to suppress excessive braking to the vehicle.

Item 2. The control apparatus according to Item 1, further comprising:

an intersection determination unit configured to determine whether or not it is permitted to pass an intersection in front of the vehicle even on a red light (step S601), wherein, in a case where it is not determined that there is the possibility that the vehicle will collide with the moving object, and it is determined that a traffic light at the intersection is red and that it is permitted to pass the intersection even on a red light, the braking control unit applies the second braking force to the vehicle.

According to this embodiment, it is possible to more appropriately suppress excessive braking to the vehicle based on whether or not it is permitted to pass the intersection on a red light.

Item 3. The control apparatus according to Item 2, wherein the intersection determination unit determines whether or not it is permitted to pass an intersection in front of the vehicle in a specific direction even on a red light, and whether or not the vehicle is to pass the intersection in the specific direction (step S602), and in a case where it is determined that a traffic light at the intersection is red and that it is permitted to pass the intersection in a specific direction even on a red light, and it is not determined that the vehicle is to pass the intersection in the specific direction, the braking control unit applies the first braking force to the vehicle.

According to this embodiment, it is possible to more appropriately suppress excessive braking to the vehicle based on a direction in which the vehicle is to proceeds.

Item 4. The control apparatus according to any one of Items 1 to 3, wherein the braking control unit applies the first braking force or the second braking force to the vehicle as a travelling assist during manual driving.

According to this embodiment, it is possible to perform an appropriate travelling assist for the driver.

Item 5. A control apparatus (2) of a vehicle (1), the apparatus comprising:

a collision determination unit configured to determine whether or not there is the possibility that the vehicle will collide with an object (203) that is moving in a direction intersecting a longer direction of the vehicle (step S402):

a signal determination unit configured to determine whether or not a traffic light in front of the vehicle is red (step S403):

an intersection determination unit configured to determine whether or not it is permitted to pass an intersection in front of the vehicle, even on a red light (step S601); and a travelling control unit configured to control travelling of the vehicle (steps S701 and S702), wherein, when the vehicle is travelling toward an intersection through automated driving, in a case where it is determined that there is the possibility that the vehicle will collide with the moving object, and in a case where it is determined that the traffic light at the intersection is red and it is not determined that it is permitted to pass the intersection even on a red light, the travelling control unit stops the vehicle (step S702).

According to this embodiment, it is possible to suppress excessive braking to the vehicle. Furthermore, it is possible to appropriately stop the vehicle when automated driving is being performed.

Item 6. The control apparatus according to Item 5, wherein the intersection determination unit determines whether or not it is permitted to pass an intersection in front of the vehicle in a specific direction even on a red light, and whether or not the vehicle is to pass the intersection in the specific direction (step S602), and in a case where it is determined that a traffic light at the intersection is red and that it is permitted to pass the intersection in a specific direction even on a red light, and it is not determined that the vehicle is to pass the intersection in the specific direction, the travelling control unit stops the vehicle.

According to this embodiment, it is possible to more appropriately suppress excessive braking to the vehicle based on whether or not it is permitted to pass the intersection on a red light.

Item 7. A control apparatus (2) of a vehicle (1), the apparatus comprising:

a collision determination unit configured to determine whether or not there is the possibility that the vehicle will collide with an object (203) that is moving in a direction intersecting a longer direction of the vehicle (step S402);

a signal determination unit configured to determine whether or not a traffic light in front of the vehicle is red (step S403);

an intersection determination unit configured to determine whether or not it is permitted to pass an intersection in front of the vehicle even on a red light (step S601); and a braking control unit configured to apply braking force to the vehicle (step S406), wherein, when the vehicle is travelling toward an intersection, in a case where it is determined that there is the possibility that the vehicle will collide with the moving object, the braking control unit applies braking force to the vehicle (step S406), and in a case where it is not determined that there is the possibility that the vehicle will collide with the moving object, and it is determined that a traffic light at the intersection is red, and that it is permitted to pass the intersection even on a red light, the braking control unit does not apply braking force to the vehicle.

According to this embodiment, it is possible to suppress excessive braking to the vehicle.

Item 8. The control apparatus according to Item 7, wherein the intersection determination unit determines whether or not it is permitted to pass an intersection in front of the vehicle in a specific direction even on a red light, and whether or not the vehicle is to pass the intersection in the specific direction (step S602), and in a case where it is determined that a traffic light at the intersection is red and that it is permitted to pass the intersection in a specific direction even on a red light, and it is not determined that the vehicle is to pass the intersection in the specific direction, the braking control unit applies braking force to the vehicle.

According to this embodiment, it is possible to more appropriately suppress excessive braking to the vehicle based on whether or not it is permitted to pass the intersection even on a red light.

Item 9. A vehicle (1) that includes the control apparatus (2) according any one of Items 1 to 8.

According to this embodiment, a vehicle that has the above-described advantages is provided.

The invention is not limited to the foregoing embodiments, and various variations/changes are possible within the spirit of the invention.

What is claimed is:

1. A control apparatus of a vehicle, the apparatus comprising:

a collision determination unit configured to determine whether or not there is the possibility that the vehicle will collide with an object that is moving in a direction intersecting a longer direction of the vehicle;

a signal determination unit configured to determine whether or not a traffic light in front of the vehicle is red; and an intersection determination unit configured to determine whether or not it is permitted to turn at any time at an intersection in front of the vehicle to a specific direction by way of a road that bypasses the intersection, and the vehicle is to turn at the intersection to the specific direction, a braking control unit configured to apply first braking force or second braking force that is lower than the first braking force, to the vehicle, wherein, when the vehicle is travelling toward an intersection, in a case where it is determined that there is the possibility that the vehicle will collide with the moving object, the braking control unit applies the first braking force to the vehicle, and in a case where it is not determined that there is the possibility that the vehicle will collide with the moving object and it is determined that a traffic light at the intersection is red, the braking control unit applies the second braking force to the vehicle.

2. The control apparatus according to claim 1, wherein, in a case where it is not determined that there is the possibility that the vehicle will collide with the moving object, and it is determined that a traffic light at the intersection is red and that the vehicle is to turn at the intersection to the specific direction, the braking control unit applies the second braking force to the vehicle.

3. The control apparatus according to claim 2, wherein in a case where it is determined that a traffic light at the intersection is red and that it is permitted to turn at the intersection to the specific direction even on a red light, and it is not determined that the vehicle is to turn at the intersection to the specific direction, the braking control unit applies the first braking force to the vehicle.

4. The control apparatus according to claim 1, wherein the braking control unit applies the first braking force or the second braking force to the vehicle as a travelling assist during manual driving.

5. A vehicle that includes the control apparatus according to claim 1.

6. A control apparatus of a vehicle, the apparatus comprising:
a collision determination unit configured to determine whether or not there is the possibility that the vehicle will collide with an object that is moving in a direction intersecting a longer direction of the vehicle;
a signal determination unit configured to determine whether or not a traffic light in front of the vehicle is red;
an intersection determination unit configured to determine whether or not it is permitted to turn at an intersection in front of the vehicle at any time to a specific direction by way of a road that bypasses the intersection and the vehicle is to turn at the intersection to the specific direction; and
a travelling control unit configured to control travelling of the vehicle,
wherein, when the vehicle is travelling toward an intersection through automated driving,
in a case where it is determined that there is the possibility that the vehicle will collide with the moving object, and in a case where it is determined that the traffic light at the intersection is red and it is not determined that the vehicle is to turn at the intersection to the specific direction, the travelling control unit stops the vehicle.

7. A vehicle that includes the control apparatus according to claim 6.

8. A control apparatus of a vehicle, the apparatus comprising:
a collision determination unit configured to determine whether or not there is the possibility that the vehicle will collide with an object that is moving in a direction intersecting a longer direction of the vehicle;
a signal determination unit configured to determine whether or not a traffic light in front of the vehicle is red;
an intersection determination unit configured to determine whether or not it is permitted to turn at an intersection in front of the vehicle at any time to a specific direction by way of a road that bypasses the intersection and the vehicle is to turn at the intersection to the specific direction; and
a braking control unit configured to apply braking force to the vehicle,
wherein, when the vehicle is travelling toward an intersection,
in a case where it is determined that there is the possibility that the vehicle will collide with the moving object, the braking control unit applies braking force to the vehicle, and
in a case where it is not determined that there is the possibility that the vehicle will collide with the moving object, and it is determined that a traffic light at the intersection is red, and that the vehicle is to turn at the intersection to the specific direction, the braking control unit does not apply braking force to the vehicle.

9. The control apparatus according to claim 8, wherein in a case where it is determined that a traffic light at the intersection is red and that it is permitted to tur at the intersection to the specific direction even on a red light, and it is not determined that the vehicle is to turn at the intersection to the specific direction, the braking control unit applies braking force to the vehicle.

10. A vehicle that includes the control apparatus according to claim 8.

* * * * *